(12) United States Patent
Tanaka et al.

(10) Patent No.: US 6,213,904 B1
(45) Date of Patent: *Apr. 10, 2001

(54) LOW-NOISE CHAIN HAVING BUSHINGS AND ROLLERS WITH MATCHING CURVED SURFACES TO KEEP FLUID DISPOSED THEREBETWEEN

(75) Inventors: Koji Tanaka; Takahisa Ando; Toshio Takahashi; Sachihiko Maeda; Tomofumi Otani, all of Osaka (JP)

(73) Assignee: Tsubakimoto Chain Co., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/800,579

(22) Filed: Feb. 18, 1997

(30) Foreign Application Priority Data

Feb. 26, 1996 (JP) ...................................................... 8-038173

(51) Int. Cl.[7] ................................................... F16H 57/05
(52) U.S. Cl. .............................. 474/91; 474/209; 474/231
(58) Field of Search .............................. 474/91, 202, 206, 474/209, 231; 384/291, 289, 290, 293

(56) References Cited

U.S. PATENT DOCUMENTS

| 1,352,829 | * | 9/1920 | Nelson ..................................... 474/91 |
| 1,756,759 | * | 4/1930 | Peterson et al. .................... 474/91 X |
| 1,925,055 | | 8/1933 | Mize . |
| 1,965,145 | | 4/1934 | Klaucke . |
| 3,241,893 | * | 3/1966 | Haller ..................................... 384/279 |
| 3,336,089 | * | 8/1967 | Krickler .............................. 474/91 X |
| 3,620,578 | * | 11/1971 | Fix ....................................... 474/91 X |
| 3,947,077 | * | 3/1976 | Berg et al. ............................ 384/147 |
| 4,795,408 | * | 1/1989 | Kotegawa et al. .................... 474/209 |
| 4,840,498 | * | 6/1989 | Lichtfuss .............................. 384/213 |

FOREIGN PATENT DOCUMENTS

| 2648328 | * | 4/1978 | (DE) ..................................... 384/213 |
| 396353 | | 8/1933 | (GB) . |
| 555235 | | 3/1943 | (GB) . |
| 59-79656 | | 5/1984 | (JP) . |

* cited by examiner

Primary Examiner—Blair M. Johnson
Assistant Examiner—Gregory J. Strimbu
(74) Attorney, Agent, or Firm—Armstrong, Westerman, Hattori, McLeland & Naughton

(57) ABSTRACT

A low-noise chain member comprises a bushing, a roller and oil grooves in which a wedge or squeeze effect of a lubricating oil, which is interposed between the bushing and the roller, is effective in reducing noise. The oil grooves are provided on at least one of the outer surface of the bushing and the inner face of the roller. The inner face of the roller is formed with a curved surface so as to conform to the contour of a curved outer surface of the bushing. A clearance between the inner face of the roller and the outer surface of the bushing is not widened around both ends of the roller. Only a small amount of the lubricating oil between the roller and the bushing escapes to the outside, of the roller and bushing, so that a fluid lubricating state between the bushing and the roller is maintained.

7 Claims, 5 Drawing Sheets

LOW-NOISE CHAIN HAVING BUSHINGS AND ROLLERS WITH MATCHING CURVED SURFACES TO KEEP FLUID DISPOSED THEREBETWEEN

FIELD OF THE INVENTION

The present invention relates to a low-noise chain with oil grooves having a structure for reducing noise which is made when a sprocket and a roller engage each other.

BACKGROUND OF THE INVENTION

A conventional chain for transmission or conveyance has a problem that when a tooth flank of a sprocket is engaged with a roller of a chain, noise occurs due to collision of the sprocket and the roller. For example, a technique in which a number of elastic bodies are embedded on the outer face of a bushing of a chain and an impact applied from the tooth flank of a sprocket to the roller is cushioned by the elastic bodies is proposed in Japanese Unexamined Utility Model Publication No. 59-79656.

However, the technique described in the Japanese publication No. 59-79656 has a problem such that since the elastic bodies are protruded from the outer face of the bushing, it is difficult to form an oil film by a lubricating oil and the elastic bodies are quickly worn out.

It is, consequently, considered that the impact is cushioned in the following manner. As shown in FIG. 8, a chain C includes outer plates O, inner plates I, a chain pin P, a bushing B, and a roller R. Oil grooves G which are narrow and long in the axial direction of the bushing B are formed at a plurality of positions in the radial direction on the outer face of the bushing B of the chain C. A portion between the bushing B and the roller R is filled with a lubricating oil L in a state where the lubricating oil L is stored in the oil grooves G. When the roller R collides with the tooth flank of a sprocket (not shown) and is impacted, the impact is cushioned by a wedge or squeeze effect of the lubricating oil L interposed between the bushing B and the roller R.

However, in the chain C with such a construction, the outer face of the bushing B is deformed to a barrel shape, i.e., bulging outward in the middle (hereinlater, simply called a barrel shape), in an assembling step of press-fitting both ends of the bushing B to bushing holes H of the inner plates I. Consequently, a clearance S between the inner face of the roller R and the outer face of the bushing B is widened near both ends of the roller R having the cylindrical inner face and the lubricating oil L easily escapes to the outside. The portion between the outer face of the bushing B and the inner face of the roller R enters a mixed or boundary lubrication state, so that the wedge or squeeze effect is not fully shown. Thus, there is a problem that the capability of reducing noise is lowered.

It is, therefore, an object of the present invention to provide a low-noise chain with oil grooves, which solves the problem of the conventional technique and in which a wedging or squeezing effect of a lubricating oil which is interposed between a bushing and a roller is effectively taught, thereby obtaining an excellent effect of noise reduction.

SUMMARY OF THE INVENTION

In order to achieve the object, according to the first aspect of the invention, there is provided a low-noise chain with oil grooves in which the oil grooves are formed on at least one of the outer face of the bushing and the inner face of the roller, and the inner face of the roller is formed in a curved face which is along an outline of a barrel shape of the outer face of the According to the second embodiment of the present invention, there is provided a low-noise chain with oil grooves in which the oil grooves are formed on at least one of the outer face of the bushing and the inner face of the roller, and protruding portions, which can be fit into the oil grooves, are provided on at least one of the inner face of the roller and the outer face of the bushing. Preferably, the inner face of the roller is formed in a curved face which is along the outline of the barrel shape of the outer face of the bushing.

In the low-noise chain with oil grooves according to the first embodiment of the present invention, the inner face of the roller is formed in a curved shape so as to be along the outline of the barrel shape, which is formed upon assembling the chain, of the outer face of the bushing. Therefore, the clearance between the inner face of the roller and the outer face of the bushing is not widened near both ends of the roller, so that only a small amount of the lubricating oil between the roller and bushing escapes to the outside.

Since the fluid lubricating state is maintained for a long time between the bushing and the roller, and a cushioning effect of the lubricating oil is fully available for the collision when the tooth flank of the sprocket and the roller are engaged and thus, the noise caused by the collision is reduced.

In the low-noise chain with oil grooves according to the second embodiment of the present invention, when the roller is impacted by the collision of the tooth flank of the sprocket and the roller, the lubricating oil filling the oil grooves is pushed by the protruding portions and escapes from the narrow clearance between the oil groove and the protruding portions. Consequently, the squeeze or wedge effect of the lubricating oil occurs and the cushion effect for the collision is obtained, thereby reducing the noise caused by the collision.

According to the second embodiment of the present invention, when the inner face of the roller is formed in a curved face along the outline of the barrel shape of the bushing outer face, only a small amount of the lubricating oil interposing between the roller and bushing escapes to the outside, so that the effect of reducing the noise is excellently maintained for a long time.

DETAILED DESCRIPTION OF THE INVENTION

Figure 1:
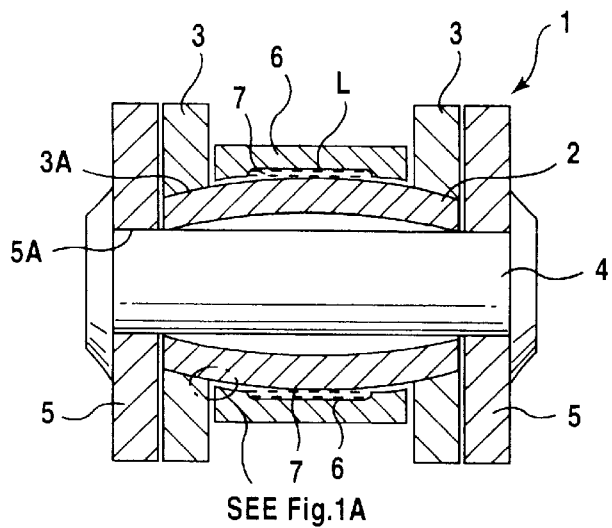
FIGS. 1 and 1a are a cross-sectional view and a further detailed cross-sectional view of the area enclosed by the oval in FIG. 1, respectively, of a chain showing the first embodiment of a low-noise chain with oil grooves according to the present invention.
Figure 1A:
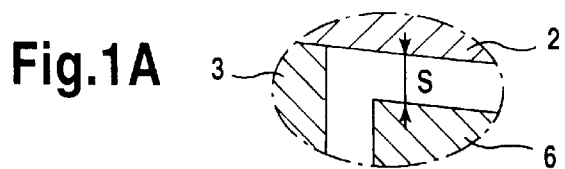

Embodiments of the present invention will be described hereinbelow with reference to drawings. FIG. 1 is a section view showing the first embodiment of the low-noise chain with oil grooves of the present invention. In a chain 1, both ends of a bushing 2 are fit and fixed to bushing holes 3A formed in a pair of inner plates 3. A chain pin 4, which is inserted into the bushing 2, is fit and fixed to pin holes 5A of outer plates 5 which are arranged on both outer sides of the pair of inner plates 3. A roller 6 is rotatably supported by the outer face of the bushing 2 between the pair of inner plates 3.

A plurality of oil grooves 7 which are narrow and long in the axial direction are formed in the inner face of the roller 6. The lubricating oil L is stored in the oil grooves 7. The inner face of the roller 6 is formed in a curved face bulging outward in the middle, so as to be along the outline of the curved outer face of the bushing 2 having a barrel shape in which the middle portion is bulged outward in the radial direction upon assembling the chain 1. A clearance S between the outer face of the bushing 2 and the inner face of the roller 6 is not widened toward the outside but is uniform.

Figure 2:
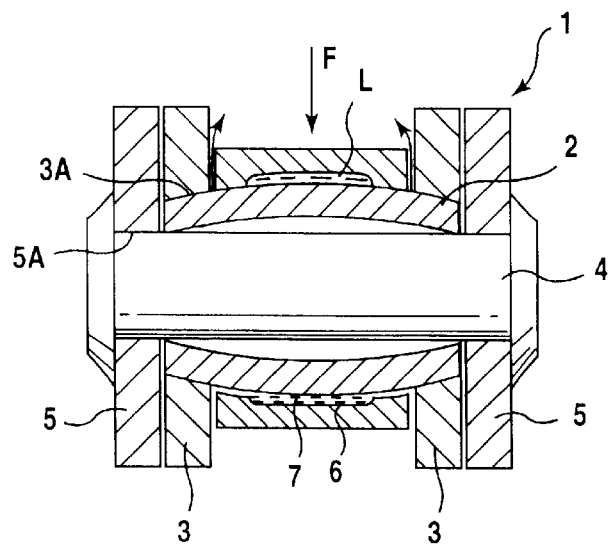
FIG. 2 is a sectional view showing a state where an impact force acts on a roller of the low-noise chain oil grooves according to the present invention.

FIG. 2 is a diagram showing a state where the roller 6 of the chain 1 with the above-described construction collides with the tooth flank of a sprocket and receives an impact force F when the roller 6 is engaged with the sprocket. When the tooth flank of the sprocket (not shown) falls and collides with the roller 6, the roller 6 is slightly deviated downwardly towards the bushing 2 by the impact force F and the lower side of the inner face of the roller 6 momentarily approaches the outer face of the bushing 2.

The lubricating oil L, sandwiched by the roller 6 and the bushing 2, is pushed out to the widened clearance between the lower side of the outer face of the bushing 2 and the lower side of the inner face of the roller 6 and a part of the oil L is pushed out from both ends of the roller 6 to the outside. In this instance, a squeeze and wedge effect occurs in which the lubricating oil L, interposed between the upper side of the inner face of the roller 6 which received the impact force F and the outer face of the bushing 2, has increased pressure and cushions the impact force F. Therefore, noise occurring upon collision between the tooth flank of the sprocket and the roller 6 is reduced. The clearance S between the inner face of the roller 6 and the outer face of the bushing 2 is not widened outward in comparison with a conventional chain using a roller in which the inner face has a cylindrical shape. Consequently, the amount of the lubricating oil L which escapes to the outside from both ends of the roller 6 is suppressed to a slight amount.

Figure 3:
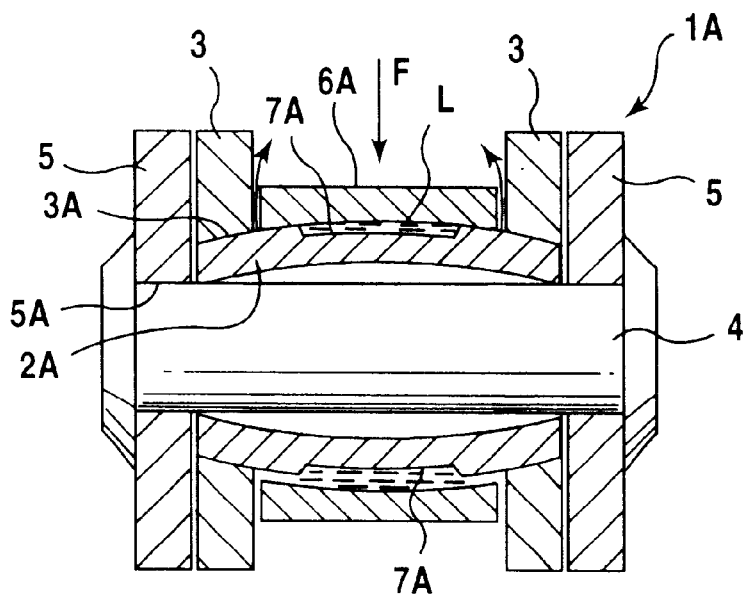
FIG. 3 is a sectional view of a chain showing the second embodiment of the present invention.

FIG. 3 is a section view showing the second embodiment of the low-noise chain with oil grooves of the present invention. According to the second embodiment, oil grooves 7A, which are narrow and long in the axial direction, are formed at a plurality of portions in the radial direction on the outer rim face of a bushing 2A of a chain 1A. The inner face of a roller 6A is formed in a smooth curved face which is along the outer face of the barrel shape of the bushing 2A. Elements designated by the same reference numerals as those in FIG. 1 have the same constructions as those in the first embodiment, respectively.

FIG. 3 shows a state where the roller 6A received the impact force F from the tooth flank of the sprocket (not shown). In a manner similar to the foregoing embodiment, the squeeze or wedge effect occurs in which the lubricating oil L, interposed between the upper side of the inner face of the roller 6A and the outer face of the bushing 2A, has an increased pressure, thereby cushioning the impact force F.

Figure 4:
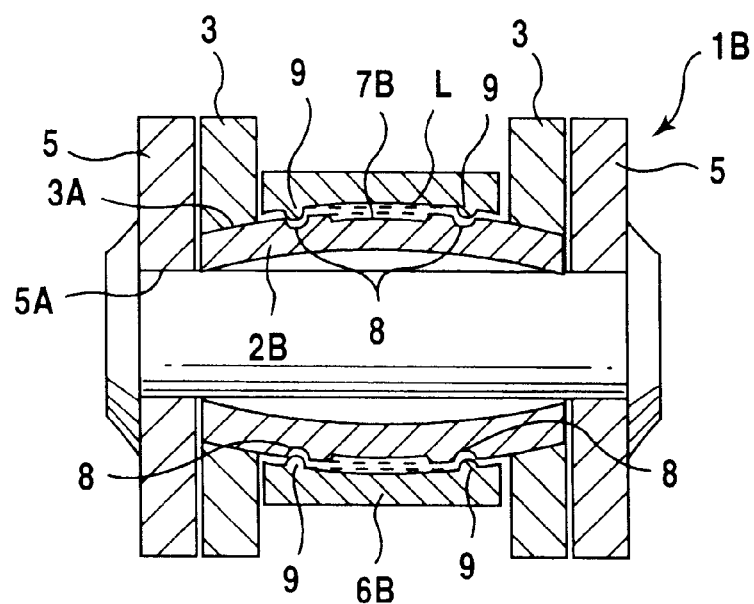
FIG. 4 is a sectional view of a chain showing the third embodiment of the present invention.

FIG. 4 is a section view showing the third embodiment of the low-noise chain with oil grooves of the present invention. In a chain 1B of the third embodiment, oil grooves 7B each having a shape similar to that of the oil groove 7A of the second embodiment as shown in FIG. 3 are formed on the outer face of a bushing 2B and a pair of annular grooves 8 are formed on both sides of the oil grooves 7B. A pair of projections 9, which continue in the circumferential direction, are formed on the inner face of the roller 6B so as to face the pair of annular grooves 8. The pair of projections 9 are fit into the facing annular grooves 8, respectively, so as to have a slight clearance in the annular grooves 8, through which the lubricating oil can flow.

According to the third embodiment, by providing the projections 9 and the annular grooves 8, the escaping amount of the lubricating oil L interposed between the bushing 2B and the roller 6B is smaller than that of in each of the foregoing embodiments. When the roller 6 collides with the tooth flank of the sprocket, the squeeze or wedge effect occurs in the lubricating oil L existing between the annular grooves 8 and the projections 9, so that a supporting cushion effect for the impact force by the collision can be obtained. In FIG. 4, the elements having the same reference numerals as those in FIGS. 1 to 3 have the same constructions as those in the foregoing embodiments.

Figure 5:
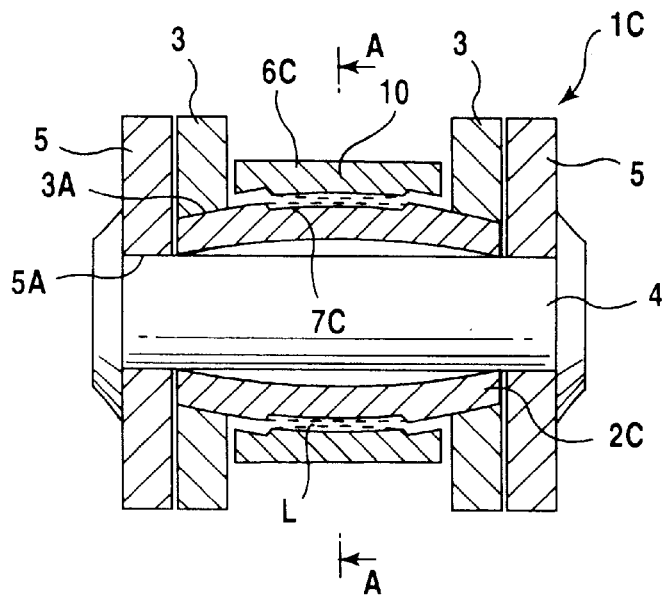
FIG. 5 is a on view of a chain showing the fourth embodiment of the present invention.
Figure 6:
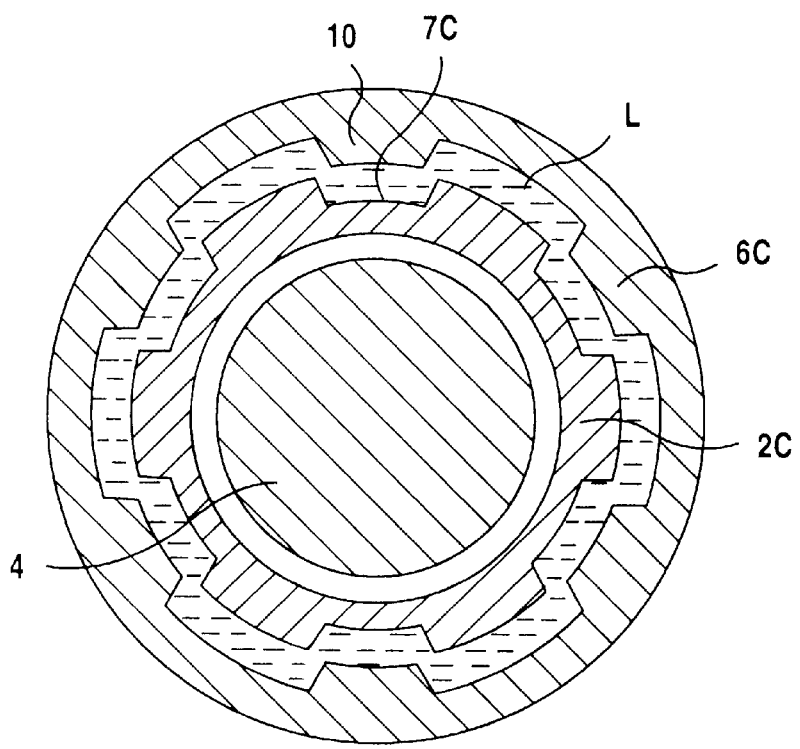
FIG. 6 is a cross-sectional view long line A—A of FIG. 5.

FIG. 5 is a section view showing the fourth embodiment of the low-noise chain with oil grooves of the present invention. FIG. 6 is a transverse cross section taken on line A—A of FIG. 5. In a chain 1C of the embodiment, oil grooves 7C, which are similar to those in the second embodiment shown in FIG. 3 and which extend from the center in the axial direction to portions near both ends of a roller 6C, are formed at a plurality of positions in the radial direction on the outer face of a bushing 2C. A plurality of protruding portions 10, which can fit into the oil grooves 7C, are formed on the inner face of the roller 6C. The protruding portions 10 are not fit into the oil grooves 7C of the bushing 2C in a normal state and the roller 6C can freely rotate with respect to the bushing 2.

Figure 7:
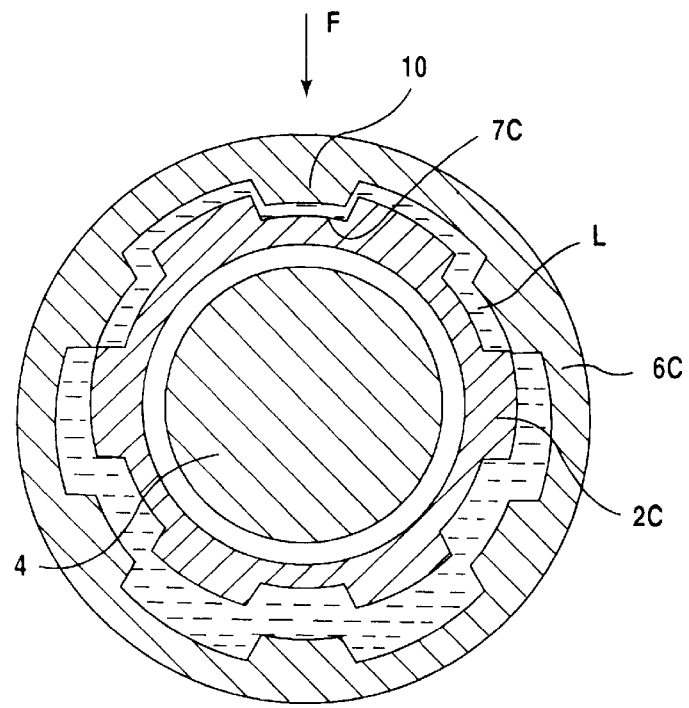
FIG. 7 is a cross-section view taken along line A—A of FIG. 5, showing a state where an impact force on a roller.
Figure 8:
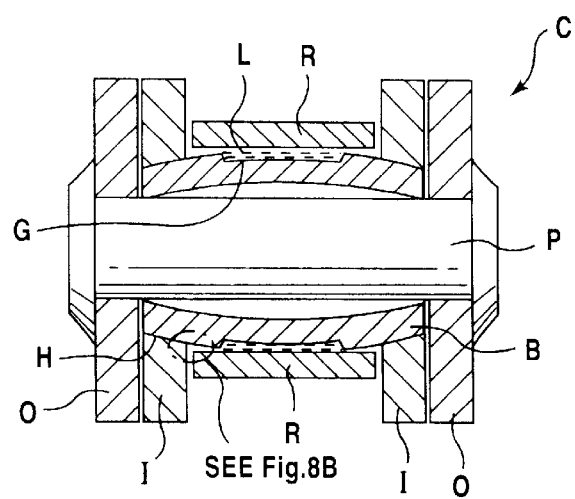
FIGS. 8(A) and 8(B) are a sectional views showing a construction of a conventional low-noise chain with oil grooves.
Figure 8:
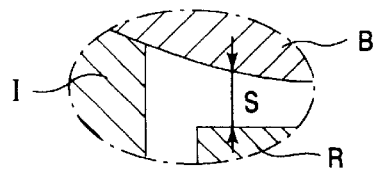

As shown in FIG. 7, when the roller 6C collides with the tooth flank of the sprocket, receives the impact force F, and is deviated from the bushing 2C, the protruding portions 10 on the inner face of the roller 6C are fit into the oil grooves 7C. In the case where the impact force F is received when the protruding portions 10 and the oil grooves 7C are not face-to-face, the roller 6C is rotated by the collision with the tooth flank of the sprocket and the protruding portions 10 are moved to the positions to face the oil grooves 7C and are fit into the oil grooves 7C.

By fitting the protruding portions 10 into the oil grooves 7C, the lubricating oil L filling the oil grooves 7C is pushed by the protruding portions 10 and escapes from the narrow clearance between the oil grooves 7C and the protruding portions 10. The squeeze or wedge effect occurs in the lubricating oil and the cushion effect takes place, so that the noise caused by the collision is reduced. In FIGS. 5 and 6, the elements designated by the same reference numerals as those in FIGS. 1 to 4 have the same constructions as those in the above-mentioned embodiments.

Although the oil grooves 7C are provided on the outer face of the bushing 2C and the protruding portions 10 are provided on the inner face of the roller 6C in the fourth embodiment, the oil grooves 7C can be also formed on the inner face of the roller 6C as in the first embodiment shown in FIG. 1 and the protruding portions 10 can be formed on the outer face of the bushing 2C so as to correspond to the oil grooves 7C. The oil grooves and the corresponding protruding portions 10 can be also formed on both sides of the outer face of the bushing 2C and the inner face of the roller 6C.

Figure 9:
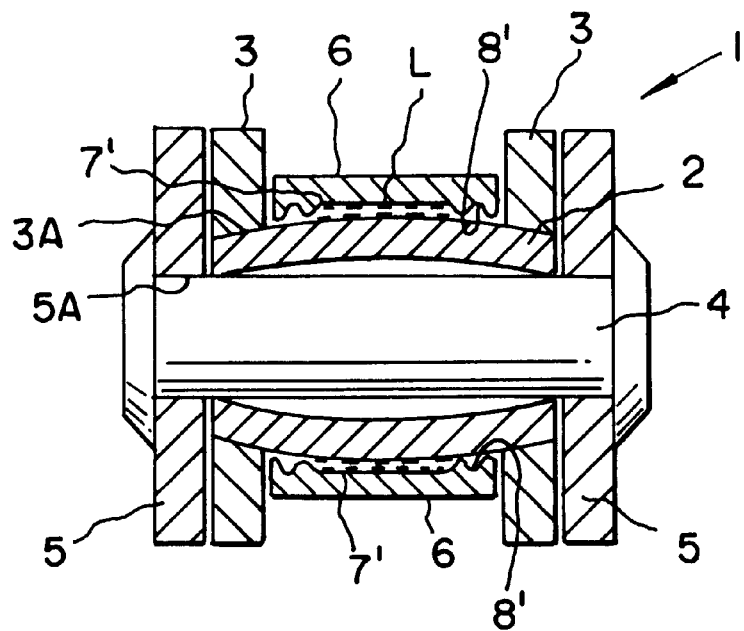
FIG. 9 is a cross-sectional view of an embodiment where oil grooves and annular grooves are formed in the inner face of the roller.
Figure 10:
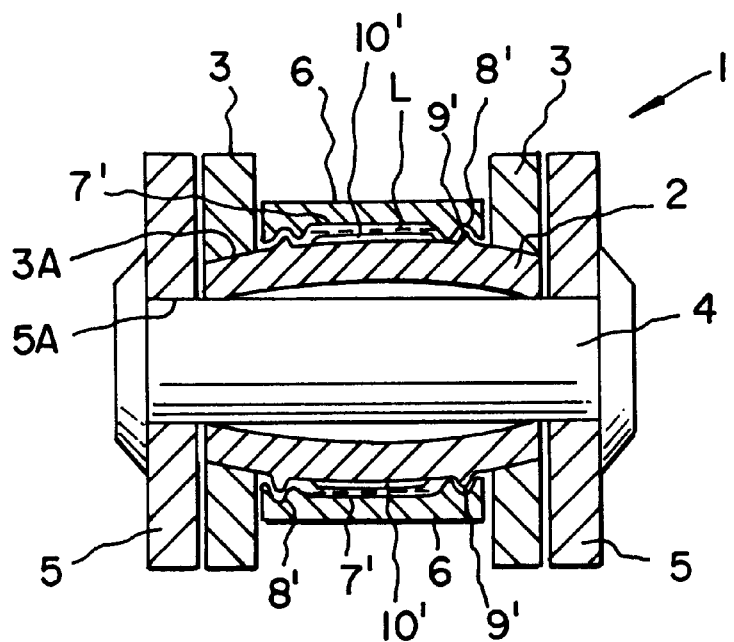
FIG. 10 is a cross-sectional view of an embodiment wherein a plurality of protruding portions on the bushing are received in the annular grooves of the roller.

In FIG. 9, an embodiment is shown where oil grooves 7' are formed in the inner face of the roller 6 and annular grooves 8' also formed therein, while in FIG. 10 a further embodiment is shown where a plurality of protruding portions 10' are shown receivable in the oil grooves 7' and protruding portions 9' in annular grooves 8'.

The oil grooves and protruding portions formed on the outer face of the bushing and the inner face of the roller are not limited to the shapes shown in the foregoing embodiments. Various numbers and shapes of the oil grooves and the protruding portions can be used in accordance with the diameters, lengths, and similar of the bushing and roller. In case of shapes where oil grooves are open at both ends of the roller or bushing, a sealing member such as an O-ring hermetically seals the connection between the end face of the roller and the inner face of the inner plate or the outer sides of the grooves between the facing inner and outer plates, thereby suppressing the escape of the lubricating oil to the outside.

As mentioned above, according to the low-noise chain with oil grooves of the present invention, the inner face of the roller is formed in a curved face which is along the outline of the barrel shape of the outer face of the bushing, which is formed upon assembling of the chain, so that the clearance between the outer face of the bushing and the inner face of the roller is not widened near both ends of the roller. Consequently, the escaping amount to the outside of the lubricating oil filling the portion between the roller and bushing and the oil grooves which are provided in at least one of the outer face of the bushing and the inner face of the roller can be reduced.

As a result, the portion between the bushing and the roller can be maintained in a fluid lubricating state for a long time. The cushion effect of the lubricating oil is fully available, upon collision, when the tooth flank of the sprocket and the roller are engaged with each other. Consequently, the noise caused by the collision is reduced, the wear of the contacting portions of the bushing and the roller is suppressed, and the durability of the chain can be improved.

According to the low-noise chain with oil grooves of the present invention, the oil grooves are provided in at least one of the outer face of the bushing and the inner face of the roller, and the protruding portions, which can be fit into the oil grooves, are provided in at least one of the inner face of the roller and the outer face of the bushing. Consequently, when the tooth flank of the sprocket and the roller are engaged with each other, the lubricating oil is sandwiched by the protruding portion and the oil grooves, and the squeeze or wedge effect occurs, thereby obtaining the cushion effect. Thus, the noise upon engagement can be remarkably reduced.

In addition to the construction in which the protruding portions, which can be fit into the oil grooves, are provided in at least one of the inner face of the roller and the outer face of the bushing, when the inner face of the roller is formed in a curved face which is along the outline of the barrel shape of the outer face of the bushing, the amount of lubricating oil interposed between the roller and the bushing escaping is small. The excellent effect of reducing noise can be maintained for a long time, and the durability of the chain can be improved.

What is claimed is:

1. A low-noise chain member, comprising:
   a pair of inner plates each having a bushing hole therein;
   a pair of outer plates each having a pin hole therein;
   a chain pin inserted through each of said pin holes and each of said bushing holes and secured at opposite ends thereof to said outer plates;
   a hollow tubular bushing having opposite ends which are press-fitted into said bushing holes to secure said bushing to said inner plates, said bushing having an axially curved outer face extending between said opposite ends of said bushing;
   a hollow cylindrical roller rotatably supported on said bushing and having opposite ends and an axially curved inner face extending between said opposite ends of said roller, said inner face being complementary in contour to said curved outer face of said bushing so that a clearance between the curved outer face of said bushing and the curved inner face of the hollow cylindrical roller is not widened near each end of said hollow cylindrical roller; and
   at least one of said outer face of said bushing and said inner face of said roller having a plurality of oil grooves therein which extend in an axial direction of said at least one of said bushing and said roller and are spaced circumferentially about said at least one of said bushing and said roller.

2. The low-noise chain member according to claim 1, wherein said oil grooves are formed in said inner face of said roller.

3. The low-noise chain member according to claim 2, wherein said oil grooves extend from a longitudinal central portion of said roller, toward said opposite ends of said roller, and have a length which is less than a distance between said opposite ends of said roller;
   wherein said inner face of said roller has a pair of annular grooves formed therein between said opposite ends of said roller; and
   wherein said bushing has a pair of annular projections receivable in said annular grooves of said inner face of said roller with a clearance between said annular projections and said annular grooves.

4. The low-noise chain member according to claim 1, wherein said oil grooves are formed in said outer face of said bushing.

5. The low-noise chain member according to claim 4, wherein said oil grooves extend from a longitudinal central portion of said bushing, toward said opposite ends of said bushing, and each has a length which is less than a distance between said opposite ends of said bushing;
   wherein said outer face of said bushing has a pair of annular grooves formed therein between said opposite ends of said bushing; and
   wherein said roller has a pair of annular projections receivable in said annular grooves of said outer face of said bushing with a clearance between said annular projections and said annular grooves.

6. The low-noise chain member according to claim 4, wherein said inner face of said roller has a plurality of elongated protruding portions extending in an axial direction of said roller and each of said protruding portions received in a corresponding one of said oil grooves with a clearance between said protruding portion and said corresponding one of said oil grooves.

7. The low-noise chain member according to claim 1, wherein said oil grooves extend from a longitudinal central portion of said at least one of said bushing and said roller, toward said opposite ends of said at least one of said bushing and said roller, and have a length which is less than a distance between the opposite ends of said at least one of said bushing and said roller;

wherein said at least one of said outer face of said bushing and said inner face of said roller has a pair of annular grooves formed therein between said opposite ends of said at least one of said bushing and said roller; and wherein the other one of said bushing and said roller has a pair of annular projections receivable in said annular grooves of said at least one of said outer face of said bushing and said inner face of said roller with a clearance between said annular projections and said annular grooves.

\* \* \* \* \*